United States Patent Office 3,370,915
Patented Feb. 27, 1968

3,370,915
METHOD OF PROVIDING AN INERT ATMOSPHERE WITHIN AN ELASTOMERIC AIR CHAMBER
Lawrence R. Sperberg, 6740 Fiesta Drive, El Paso, Tex. 79912
No Drawing. Filed Dec. 16, 1966, Ser. No. 602,123
10 Claims. (Cl. 23—4)

ABSTRACT OF THE DISCLOSURE

Method of removing oxygen from the air in pneumatic tires comprising adding to the air chamber of the tires an oxygen scavenger comprising hydrazine or a deoxidized metal selected from the group consisting of zinc, iron, aluminum and magnesium. An inert diluent may be mixed with the scavenger to improve its handling characteristics and to enable it to be placed directly into the air chamber of the pneumatic tire.

BACKGROUND OF THE INVENTION

Pneumatic tires are universally inflated with compressed atmospheric air. The oxygen component of the compressed air drastically reduces the durability of the tires, as well as increasing the wear rate, due to the oxidative degradation reaction. A tire may be inflated with an inert gas, thereby causing the durability to be greatly increased as compared to a tire having oxygen contained in the inflating agent. Helium, carbon dioxide, carbon monoxide, nitrogen, and the rare gases are suitable inert inflating agents. Nitrogen is the most readily available of these inert gases. The widespread commercial use of nitrogen as an inflating agent represents a considerable continued investment of capital where bottled compressed nitrogen is used as the source of inert gas. The remaining insert gases are prohibitive in cost from a commercial viewpoint.

It is therefore expedient to provide elastomeric chambers, including pneumatic tires, with a readily available source of an inert atmosphere to thereby greatly increase the durability and to enhance the safety of the tire, especially when the tire is traveling at high speeds during the summer time when tires are more susceptible to high speed failures.

In this specification the term "elements of the tire body" include the rubber compounds employed, the cord, the cord surface treatment that helps to bond the rubber insulation compound to the cord itself, the tread compound itself, and the liner compound or inner tube whose initial main objective is simply to contain the gaseous inflating agent.

An "elastomeric chamber" includes any rubber or rubber-like pneumatic chamber, such as the cushioned spring chamber associated with the suspension system of a vehicle, for example.

SUMMARY

The present invention provides a method of increasing the durability of an elastomeric chamber, such as a pneumatic tire, by the provision of an oxygen scavenger which may be directly added to the air chamber. The scavenger eliminates the effectiveness of the oxygen that causes the oxidative degradation, such as normally occurs in air inflated pneumatic tires. The scavenger chemically changes the available oxygen of the air contained within the gas chamber of the tire into other chemical compounds, whereby the oxygen is rendered inactive since it is converted into an oxide or other inert compound.

In carrying this method into practice, several examples are cited that have been found suitable in attaining the above desired inert atmosphere. These examples include the use of the following chemical substances: hydrazine and inert gas; hydrazine and water; a mixture of zinc and bentonite clay (or alternatively talc), along with various slipping agents to enhance the free flow of the powdered zinc; iron powders admixed with a suitable diluent and a slipping agent; and deoxidized aluminum powder that may also include an inert and a slipping agent.

Description of the preferred embodiments

In carrying the present method into practice, a pneumatic tire is provided with an inert atmosphere by chemically eliminating the effectiveness of the oxygen contained therein, thereby obviating the possibility of oxygen entering into reactions with the elements of the tire body that brings about oxidative deterioration. The following examples serve as several specific illustrations of the invention:

Example 1

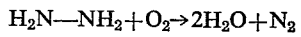

$$H_2N-NH_2+O_2 \rightarrow 2H_2O+N_2$$

Hydrazine ($N_2H_4$), when compressed, is commonly recognized as a rocket fuel because of its great affinity for oxygen. Hydrazine may be compressed into a liquid, but at lower pressures it is present as a gas. Hydrazine is commercially available as a 37% water solution and is highly stable in this form. Hydrazine is especially adapted for the removal of oxygen from the air chamber of a tire since one molecule of hydrazine reacts with one molecule of oxygen to provide two molecules of water and one molecule of nitrogen. Therefore, the change in volume within the pneumatic chamber is essentially nil, for the change in the gaseous phase is of a ratio of one to one so far as regards the oxygen and nitrogen content thereof.

The hydrazine may be incorporated into a stable water solution containing anywhere from 5% to 37% hydrazine, and the solution is preferably stored in a disposable collapsible tube or bottle having a suitable outlet thereon for direct attachment to the valve stem of a tire. It has also been found convenient to "can" the hydrazine together with a proper suppressor or diluent, in a manner similar to "aerosol bombs," with the container having a suitable fitting for connection to the tire valve stem. The diluent is preferably a gas that is easily compressed to a liquid, and accordingly exhibits a low vapor pressure. This last expedient may be used in preference to the first in order to eliminate the introduction of excessive moisture into the tire.

The amount of moisture introduced into the tire by the hydrazine/water mixture is of the order of two ounces, which does not prove a serious weight problem since the average tire often, but inadvertently, accumulates moisture in excess of this amount over a period of time due to the careless operation of the compressor equipment in some gasoline filling stations.

Example 2

Zinc, at room temperature and in the presence of air, is slowly oxidized into zinc oxide. Moisture accelerates the rate of reaction between oxygen and metallic zinc. Accordingly, a moisture remover, such as silica gel, may be used in conjunction with the finely divided zinc, as an element, is not inherently toxic; however, many of the compounds have a very unpleasant effect when injected or inhaled. It is rapidly eliminated by the body, which probably accounts for its low toxicity.

Zinc, admixed in powdered form with bentonite clay and a slipping agent such as pyrogenic silica (CAB-O-SIL), provides a suitable powder which may be placed directly into the air chamber of a pneumatic tire to thereby provide an oxygen scavenger. The zinc is slowly oxidized by the oxygen contained within the air chamber according to the reaction: $2Zn+O_2 \rightarrow 2ZnO$. The bentonite clay serves as a diluent as well as improving the handling characteristics of the powdered metallic zinc. The slipping agent cooperates with the powdered metallic zinc and the clay to thereby prevent the material from inducing imbalance within the mounted tire. The addition of silica gel slows down the rate of reaction by removing the moisture from the air chamber. The preferred weight ratio of the zinc; bentonite; Cab-O-Sil; silica gel is of the order of 2:4:1:1.

*Example 3*

Iron powder and bentonite clay are mixed together along with a slipping agent that includes pyrogenic silica, in a relative weight ratio of 1:4:1, and is placed within the air chamber of a pneumatic tire.

*Example 4*

Deoxidized aluminum or magnesium may be mixed together and substituted for the iron or zinc set forth in the above cited examples.

The scavenger of Examples 2, 3, and 4 may be placed in a collapsible container, such as a plastic bottle, and provided with a suitable fitting that enables the outlet of the bottle to be mated to the valve stem. This expedient enables the quantity of material being placed within the air chamber of the tires to be measured by viewing the flow of the chemical through the transparent container. The plastic container may be "squeezed" several times to promote the flow of chemical therefrom. Where the plastic container is capable of safely withstanding 30 p.s.i.g., it may be provided with up-set means thereon for opening the valve associated with the valve stem of a tire, thereby enabling inflated tires to be treated since the tire air chamber and the plastic container will communicate with each other and the relative internal pressure of the container may therefore be used to treat a multiplicity of tires with a measured amount of chemical, without the necessity of deflating the tire and removing the valve from the valve stem.

It will be considered obvious by others, having now read my disclosure, to mix varying proportions of the metals cited in the above examples, and thereby practice my invention using expedients other than the specific examples cited above, and to also employ oxygen scavengers other than those specifically set forth herein. Accordingly the foregoing should not be construed in a limiting manner as regards my intellectual property. Accordingly, what I claim to be my invention is set forth as follows:

I claim:
1. The method of removing oxygen from air in pneumatic tires which comprises adding to the air chamber of the tires an agent consisting essentially of pyrogenic silica, an inert diluent, and a deoxidized metal powder selected from the group consisting of zinc, iron, aluminum, and magnesium.
2. The method of claim 1, and further including utilizing silica gel along with the agent for removing moisture from the air contained in the tire.
3. The method of claim 1 wherein the metal powder is zinc.
4. The method of claim 3, and further including utilizing silica gel along with the agent for removing moisture from the gas phase of the air chamber.
5. The method of claim 3, wherein the agent is introduced directly into the air chamber of the pneumatic tire to thereby remove the oxygen from the gas phase of the air chamber.
6. The method of claim 1, wherein the agent is introduced into the air chamber of the pneumatic tire together with the inflating agent to thereby remove the oxygen from the gas phase of the air chamber.
7. The method of claim 1, wherein the metal powder is a mixture of aluminum and magnesium.
8. The method of claim 1, wherein the metal powder is magnesium.
9. The method of claim 1, wherein the metal powder is aluminum.
10. The method of claim 1, wherein the metal powder is iron.

References Cited

UNITED STATES PATENTS 2,806,767    9/1967    Chenicek _____ 23—220 X

FOREIGN PATENTS 955,081    1/1950    France.
839,524    6/1960    Great Britain.

EARL C. THOMAS, *Primary Examiner.*